Patented June 27, 1939

2,163,617

UNITED STATES PATENT OFFICE 2,163,617

PRODUCTION OF AROMATIC AMINES

Harold G. Mow, Buffalo, N. Y., assignor to National Aniline and Chemical Company, Inc., New York, N. Y., a corporation of New York No Drawing. Application January 29, 1938, Serial No. 187,756

9 Claims. (Cl. 260—580)

This invention relates to the production of aromatic amines by reduction of aromatic compounds containing nitrogen in a higher state of oxidation. The process is applicable to the formation of amines from hydrazo- azo-, azoxy-, nitroso-, and nitro-compounds.

In U. S. Patent 1,845,759 a process for the production of amines from nitro-compounds is described wherein the nitro-compound is mixed with a reducing metal and an aqueous ferrous chloride solution in a rotating reaction vessel provided with cleats on the walls thereof. By rotation of the vessel the reducing metal and nitro-compound are intimately mixed and the reduction is effected.

The process of the present invention is in the nature of an improvement on the process of the above patent.

The reducing metal most frequently employed in processes of the above type is finely divided iron, for example an iron powder passing a 20-mesh screen. Such finely divided forms of iron are usually produced commercially by grinding iron swarf which is more readily available and consists of borings, turnings, and the like. Swarf is unsatisfactory for use in such prior reduction processes because of the relatively small contact surface which a unit weight of said swarf presents for effecting a reducing action. When employed in an apparatus of the rotary type above described, the reaction, if it proceeds at all, progresses at a very slow rate.

I have made the discovery that if reductions of the aforesaid type are effected in rotary reaction vessels from which the cleats are omitted, and freely movable ponderous elements, such as rods, balls, angle irons, etc., sufficient in number to effect agitation by tumbling in the rotating vessel, are placed in the reaction vessel, not only may the reaction be carried out with swarf instead of 20-mesh iron, but what is still more surprising, the reaction may be conducted in only about two-thirds the time required with the former type of apparatus. Whether swarf or more finely divided iron is employed in my process, the reaction period is about the same. Thus the present invention has resulted in the use of a cheaper reducing agent and in a simultaneous increase of nearly 50% in reaction capacity of the rotating reaction vessel without any increase in size of the apparatus employed.

Generally in reduction processes of the present type three phases make contact with each other to produce the desired reaction: a solid phase which is constituted by the reducing metal, and two liquid phases which are constituted by an aqueous solution and the nitrogen compound respectively. Some means are essential to keep the liquids constantly intermingled and making contact with freshly exposed surfaces of the reducing metal from which the oxide produced by the reduction is constantly removed by abrasion.

In the course of the process of reduction effected in the previous apparatus involving cleats for carrying the reducing metal along with the rotating vessel, the reducing metal was picked up, carried to near the top, and then released to fall down through the mass of the liquid in the vessel. In this way the liquid and solid phases in the vessel were kept more or less intermingled.

I have found that when using freely movable agitating elements in a rotary mill, efficient reaction between iron, water, and nitrogen compound to be reduced may be obtained with the liquid phases in the form of an emulsion. In order to provide an emulsion during the reaction, it is not necessary to introduce any emulsifying agent other than the reactant materials but the ratio of the amount of aqueous solution present to the amount of nitrogen compounds present should be maintained at a low value. An excess of aqueous solution, in the absence of emulsifying agents, will destroy the emulsion and reduce the efficiency of the process. It should be noted in this connection that the important feature is the maintenance of an emulsion rather than limitation of the aqueous content, and my invention does not preclude the use of larger than normal quantities of water in the aqueous phase as long as an emulsion is maintained whether by the addition of an extraneous emulsifying agent or otherwise.

In the previous process the relatively limited amount of contact and friction between the iron particles of swarf or ground iron effected a very limited abrasion and removal of iron oxide from the surfaces of the iron particles. In the present process the movable elements cause the swarf or ground iron to be crushed, rubbed, turned over and abraded, thereby removing iron oxide from the metal surfaces, which are thus exposed to the action of the emulsified reaction mixture.

The process of the present invention is particularly concerned with the reduction of aromatic nitro-compounds by means of iron. However, it will be obvious to those skilled in the art that it may be applied with facility to the reduction of nitrogen compounds in which the nitrogen exists in a state of oxidation intermediate the nitro and the amino stages, and may be accomplished with reducing metals other than iron, for example zinc, tin, etc. During the reduction it is desirable, as is well recognized in the art, to have present in the aqueous phase an electrolyte which gives rise to acid ions, for example hydrochloric acid, sulfuric acid, acetic acid, ferrous chloride, etc.

In accomplishing the reduction of nitro-compounds by means of iron, it is advantageous to employ an amount of iron which is about 15% in excess of that theoretically required on the basis that the iron is oxidized to $Fe_3O_4$ in converting the nitro-compound to the amine. However, a large excess of iron needlessly increases the cost of producing the amine by increasing the amount of materials consumed and handled, the power required for rotating the reaction vessel and its load, and by increasing difficulties in separating the products. The amount of water employed in the aqueous solution may equal about one-fourth the weight of the iron employed. Up to about twice this amount of water may be used without breaking the emulsion in ordinary operations.

The following examples further illustrate my invention. Parts are by weight.

*Example 1.*—Reduction of alpha-nitronaphthalene to alphanaphthylamine.

2800 parts of swarf, 130 parts of an aqueous 35% ferrous chloride solution, and 600 parts of water are charged to a horizontally disposed steel rotatable cylinder containing freely movable agitating members (such as one to several rows of steel balls of the same or different diameters resting on the floor of the cylinder), such as illustrated in my application Serial No. 187,757 of even date entitled "Distillation of amines from reduction masses". The cylinder and balls advantageously may be constructed of a chromium or chromium-nickel alloy steel to resist the corrosive effect of the acid solution. After introduction of the swarf, ferrous chloride, and water, the steel cylinder may be rotated at about 8 R. P. M. and heated externally until the liquid charge reaches its boiling point. A vapor conduit may lead from one end of the cylinder through a suitable stuffing box to a reflux condenser. Heating is regulated so as to provide steady boiling, condensate from the reflux condenser being returned via the vapor conduit. 3350 parts of molten alpha-nitronaphthalene are fed gradually from a feed tank into the other end of the cylinder, the rate of feeding being maintained at a point such that the reaction generates sufficient heat to cause vigorous but not excessive refluxing without the application of external heat to the cylinder. When all of the nitronaphthalene has been charged to the cylinder, which with a 1½ to 2 ton charge may require around seven hours, the feed line is closed and the cylinder is rotated until the reduction is complete as indicated by a test on a sample of the charge. This may require around 20 or 22 hours for a 1½ to 2 ton charge. When the reaction is complete, the reaction product may be blown or sucked from the cylinder or vacuum distilled directly therefrom. By this process an alphanaphthylamine product of commercial purity and equivalent to about 93% of the theoretically possible yield may be obtained. The reaction product may be neutralized by the addition of alkaline material, e. g. lime, sodium carbonate, or sodium hydroxide, prior to its removal from the reaction vessel whether it is removed as liquid or by distillation. If it is removed as liquid, it may be charged to a second similar vessel and distilled therefrom as described in my application referred to above. When the distillation is conducted in this manner it is not necessary that the distillation vessel be of the corrosion resistant type since the corrosive acids may be neutralized prior to the distillation. Such a procedure on the other hand has the disadvantage of requiring transfer of the reaction products from one vessel to another. If the amine is distilled from the reaction vessel, the sludge remaining therein, and comprising chiefly iron oxide, may be mixed with sufficient water to form a fluid slurry which can then be blown, sucked, or run out from the vessel.

*Example 2.*—Reduction of nitrobenzene to aniline.

A vat is charged with about 56 parts iron, 121 parts aqueous 32% (20° Bé.) hydrochloric acid solution and 29 parts water. After a period of 4 to 6 hours, the faintly acid or neutral ferrous chloride solution is charged to a reducing mill of the type used in Example 1. To the solution in the mill 3800 parts iron borings (20 mesh) and 850 parts water also are added. The mill is connected with its reflux condenser, and its contents are heated to the refluxing temperature. 3000 parts of nitrobenzene are then run into the heated rotating mill at such a rate that the heat of reaction is sufficient to keep the reacting mass constantly at the refluxing temperature. After all the nitrobenzene has been added, the reaction mass is heated by external means until the reduction is complete. 41 parts of hydrated lime are then added to the mass, which is heated again to refluxing temperature for about 15 minutes. The mill is then shut off from the reflux condenser and connected with a distillation condenser. The batch in the rotating mill is boiled to distill off all water, which is condensed and run to one of the provided receivers. Then the mill contents are heated to about 175° C. while the system is gradually evacuated, and the aniline is distilled off in vacuo at a rate of about 400 to 500 parts per hour, and run to appropriate receivers. The distillation is considered ended when no more aniline distills over at 175° C. at an absolute pressure corresponding to about one to two inches of mercury.

The mill is then cooled by external means to about 100° C., and the residue, comprising chiefly iron oxide, is mixed with water to form a fluid, aqueous slurry which can be blown, sucked, or run out from the mill.

The aniline water is used as charging water for the next batch. The aniline oil is withdrawn to suitable storage. It is a high grade product suitable for most technical purposes, and is readily rectified to produce water-white oil. The average yield of aniline is about 97 per cent of that theoretically possible from the charge of nitrobenzene reduced.

*Example 3.*—Reduction of meta dinitrobenzene to meta-phenylene-diamine.

The mill is charged with 3500 parts iron borings (20 mesh), 1500 parts water and 30 parts of aqueous 70% acetic acid solution. The mixture is heated in the rotating mill to its refluxing temperature. 1760 parts of meta-dinitrobenzene are introduced into the mill slowly and at a rate to maintain refluxing by heat of reaction. After complete reduction 26 parts of lime are added to the reaction mass and the contents of the mill are then distilled in vacuo, water and meta-phenylene-diamine being directed to the appropriate receivers. When the distillation is complete, the residue comprising iron oxide, is slurried with water and removed from the mill as in the previous examples.

The meta-phenylene-diamine thus obtained is an almost colorless crystalline mass, and has a solidifying point of about 62.6° C. Yield is equivalent to about 93 per cent of the theoretically possible figure based on the amount of dinitrobenzene treated.

In the process of Example 3, 1910 parts meta-dinitro-toluene may be reduced in place of the dinitrobenzene, and a yield equivalent to 93 per cent of the theoretically possible yield can be obtained. The meta-tolylene-diamine can be maintained as a liquid in the receiver and when the distillation is finished, the diamine can be run to a flaker and finished off as a dry, flaky product having a solidifying point of about 98° C.

I claim:

1. In the production of an aromatic amine by the reducing action of a reducing metal on an aromatic compound of the group consisting of nitro, azo-, hydrazo-, azoxy-, and nitroso- compounds of the benzene and naphthalene series, the improvement which comprises subjecting an aqueous emulsion of the aromatic compound to the action of the reducing metal in a rotary mill containing freely movable agitators which subject said metal to a grinding action during the reduction.

2. In the production of an aromatic amine by the reducing action of metallic iron on an aromatic compound of the group consisting of nitro, azo-, hydrazo-, azoxy-, and nitroso- compounds of the benzene and naphthalene series, which comprises producing an aqueous emulsion of the aromatic compound in a ball mill containing swarf and rotating the ball mill during the reduction to subject the emulsion to contact with fresh metal surfaces created by the action of the balls of said mill upon said swarf.

3. The method of producing an aromatic amine by reduction of an aromatic compound of the group consisting of nitro, azo-, hydrazo-, azoxy-, and nitroso- compounds of the benzene and naphthalene series, which comprises gradually adding the aromatic compound to a mixture of an emulsion of aqueous ferrous chloride solution and the aromatic compound, and divided iron in a ball mill, and rotating said mill during the reduction so as to subject said iron to the grinding action of the balls in said mill and thereby to provide a continuous supply of fresh reducing metal surfaces in contact with the emulsion.

4. In the production of aniline by the reducing action of a reducing metal on nitrobenzene, the improvement which comprises subjecting an aqueous emulsion of the nitrobenzene to the action of the reducing metal in a rotary mill containing freely movable agitators which subject said metal to a grinding action during the reduction.

5. In the production of alpha-naphthylamine by the reducing action of a reducing metal on alpha-nitronaphthalene, the improvement which comprises subjecting an aqueous emulsion of the alpha-nitronaphthalene in liquid phase to the action of the reducing metal in a rotary mill containing freely movable agitators which subject said metal to a grinding action during the reduction.

6. In the production of meta-phenylene-diamine by the reducing action of a reducing metal on meta-dinitrobenzene, the improvement which comprises subjecting an aqueous emulsion of the meta-dinitrobenzene to the action of the reducing metal in a rotary mill containing freely movable agitators which subject said metal to a grinding action during the reduction.

7. The method of producing aniline by reduction of nitrobenzene, which comprises gradually adding the nitrobenzene to a mixture of an emulsion of an aqueous ferrous chloride solution and nitrobenzene, and divided iron in a ball mill, and rotating said mill during the reduction so as to subject said iron to the grinding action of the balls in said mill and thereby to provide a continuous supply of fresh reducing metal surfaces in contact with the emulsion.

8. The method of producing alpha-naphthylamine by reduction of alpha-nitronaphthalene, which comprises gradually adding the alpha-nitronaphthalene to a mixture of an emulsion of aqueous ferrous chloride solution and the alpha-nitronaphthalene, and divided iron in a ball mill, and rotating said mill during the reduction so as to subject said iron to the grinding action of the balls in said mill and thereby to provide a continuous supply of fresh reducing metal surfaces in contact with the emulsion.

9. The method of producing meta-phenylene-diamine by reduction of meta-dinitrobenzene, which comprises gradually adding the meta-dinitrobenzene to a mixture of an emulsion of aqueous ferrous chloride solution and the meta-dinitrobenzene, and divided iron in a ball mill, and rotating said mill during the reduction so as to subject said iron to the grinding action of the balls in said mill and thereby to provide a continuous supply of fresh reducing metal surfaces in contact with the emulsion.

HAROLD G. MOW.